US008929893B2

(12) United States Patent
Gollapudi et al.

(10) Patent No.: US 8,929,893 B2
(45) Date of Patent: Jan. 6, 2015

(54) PLMN SELECTION IN MULTI-NETWORK ENVIRONMENT

(75) Inventors: Sreelakshmi Gollapudi, Tokyo (JP); Stuart Findlay, Tokyo (JP); Iskren Ianev, Tokyo (JP); Yannick Lair, Tokyo (JP)

(73) Assignee: NEC Corporation, Tokyo (JP)

( * ) Notice: Subject to any disclaimer, the term of this patent is extended or adjusted under 35 U.S.C. 154(b) by 487 days.

(21) Appl. No.: 12/742,344

(22) PCT Filed: Jan. 23, 2009

(86) PCT No.: PCT/JP2009/051516
§ 371 (c)(1),
(2), (4) Date: May 11, 2010

(87) PCT Pub. No.: WO2009/096496
PCT Pub. Date: Aug. 6, 2009

(65) Prior Publication Data
US 2010/0261474 A1    Oct. 14, 2010

(30) Foreign Application Priority Data
Jan. 30, 2008    (GB) .................................. 0801635.4

(51) Int. Cl.
*H04W 4/00*    (2009.01)
*H04W 48/18*    (2009.01)

(52) U.S. Cl.
CPC .................................... *H04W 48/18* (2013.01)
USPC ........ 455/435.3; 455/443; 455/444; 455/512; 455/513; 455/525

(58) Field of Classification Search
USPC ................. 455/435, 427, 434, 437, 450, 509, 455/432.1–444, 524–526, 512–513, 455/422.1–425, 67.11–67.16
See application file for complete search history.

(56) References Cited

U.S. PATENT DOCUMENTS 7,089,001 B2 *  8/2006  Leung et al. ................... 455/433
7,096,014 B2 *  8/2006  Haverinen et al. ......... 455/432.1
(Continued)

FOREIGN PATENT DOCUMENTS

EP    1175119    1/2002
EP    1469696    10/2004
(Continued)

OTHER PUBLICATIONS

International Search Report, PCT/JP2009/051516, May 6, 2009.
(Continued)

*Primary Examiner* — Sharad Rampuria
(74) *Attorney, Agent, or Firm* — Young & Thompson

(57) ABSTRACT

The present invention provides a method of PLMN selection subsequent to a change in cell for a mobile radio communications device in a multi-network cellular environment, the method including the steps of monitoring system information within a mobile radio communications device to determine the availability of a HPLMN or any other higher priority PLMN than current registered PLMN, and selecting the said HPLMN or higher priority PLMN than current registered PLMN if identified as available, and also a related network-sharing-capable UE that, when registered with a visitor PLMN, can readily check the availability of its HPLMN or any other higher priority PLMN in the system information whenever it moves to a new location area and, assuming the HPLMN or higher priority PLMN to be found, can then reselect to that PLMN.

19 Claims, 1 Drawing Sheet

(56) References Cited

U.S. PATENT DOCUMENTS

| | | | |
|---|---|---|---|
| 7,251,472 B2* | 7/2007 | Choi et al. | 455/411 |
| 7,383,054 B2* | 6/2008 | Chou et al. | 455/512 |
| 7,519,365 B2 | 4/2009 | Dorsey et al. | |
| 7,957,739 B2* | 6/2011 | Jeong et al. | 455/436 |
| 8,045,981 B2* | 10/2011 | Umatt et al. | 455/434 |
| 8,081,999 B2* | 12/2011 | Vaittinen et al. | 455/525 |
| 8,135,405 B2* | 3/2012 | Mittal et al. | 455/435.2 |
| 8,254,313 B2* | 8/2012 | Vikberg et al. | 370/328 |
| 8,260,291 B2* | 9/2012 | Wu | 455/434 |
| 8,369,852 B2* | 2/2013 | Buckley et al. | 455/434 |
| 8,543,109 B2* | 9/2013 | Kim et al. | 455/435.1 |
| 8,565,221 B2* | 10/2013 | Kodali et al. | 370/352 |
| 8,630,641 B2* | 1/2014 | Kim et al. | 455/435.1 |
| 8,681,702 B2* | 3/2014 | Tiwari | 370/328 |
| 8,700,037 B2* | 4/2014 | Hietalahti et al. | 455/435.2 |
| 2002/0068574 A1 | 6/2002 | Vestergaard et al. | |
| 2002/0119774 A1 | 8/2002 | Johannesson et al. | |
| 2003/0129971 A1* | 7/2003 | Gopikanth | 455/414 |
| 2004/0224684 A1* | 11/2004 | Dorsey et al. | 455/434 |
| 2005/0107082 A1 | 5/2005 | Gunaratnam et al. | |
| 2005/0107109 A1* | 5/2005 | Gunaratnam et al. | 455/525 |
| 2005/0153722 A1 | 7/2005 | Chou et al. | |
| 2006/0229071 A1* | 10/2006 | Haverinen et al. | 455/432.1 |
| 2007/0054666 A1 | 3/2007 | Choi | |
| 2007/0123252 A1 | 5/2007 | Tronc et al. | |
| 2010/0240367 A1* | 9/2010 | Lee et al. | 455/435.2 |

FOREIGN PATENT DOCUMENTS

| | | |
|---|---|---|
| EP | 1881716 | 1/2008 |
| FR | 2856879 | 12/2004 |
| JP | 2007-500484 | 1/2007 |
| JP | 2008-263304 | 10/2008 |
| WO | WO 2005/048626 | 5/2005 |

OTHER PUBLICATIONS

GB Search Report, GB08015635.4.

Notification of Reasons for Refusal mailed Aug. 20, 2013 in counterpart Japanese Patent Application No. 2010-519687, with English translation.

* cited by examiner

PLMN SELECTION IN MULTI-NETWORK ENVIRONMENT

BACKGROUND OF THE INVENTION

1. Field of the Invention

The present invention relates to a method of PLMN selection in multi-network environment and to a mobile radio communications device arranged for operation in such an environment.

2. Description of the Related Art

It has become increasingly common for mobile radio communications device User Equipment (UE) to achieve connection with one of a plurality of possible networks in particular to achieve continuity of service even where the Home Public Land Mobile Network (HPLMN) with which the UE is normally registered might not be (temporarily) available.

There are also various operational scenarios in which initial connection to the HPLMN might not arise and wherein the UE remains registered with the most recent Registered Public Land Mobile Network (RPLMN) even though the HPLMN, or any other higher priority PLMN, might be available and might offer a preferred connection.

With regard to the various specification proposals arising in accordance with Release $63^{rd}$ Generation Partnership Project (3GPP), the UE will always attempt to register with the last RPLMN at the time of Power-On or at the time of recovery from an out-of-service period. It has been proposed however in Release 7 3GPP specifications that a user, or network operator, can establish an option in the Subscriber Identity Module (SIM) in order to permit the UE to register with its HPLMN when available during a Power-On, or service recovery scenario.

However, such proposals take no account of the actual use of UE within a network-sharing scenario, and importantly, in scenarios whereby a UE is likely to move between different cells, generally belonging to different Location Areas, which do not offer connection to the same selection of networks.

As noted with the availability of a plurality of potential networks for connection via a UE, more than one operator can effectively share the same physical network. On this basis, the identities of all available PLMNs (via operator services) in a particular cell are transmitted to the UEs within the standard system information.

In a shared network environment, all of the cells belonging to one Location Area are arranged to offer the services of the same set of available operators. However, cells belonging to different Location Areas can offer a different selection of network operators and of course it is quite likely that a UE will move between the respective cells of such different Location Areas.

The present invention is related in particular to a scenario in which a HPLMN for a UE is available in one Location Area but not in one or more other such areas.

Currently, if a UE is registered with a RPLMN and moves into a new Location Area, no initial check for its HPLMN is conducted although some form of location update signaling is performed and in accordance in particular with 3 GPP TS 23.122 subclause 4.4.3. Here it is stated that when the mobile station reselects to a cell of a shared network, the access system may indicate multiple PLMN identities to the non-access stratum although the mobile station can choose from such multiple PLMNs, if the RPLMN is available among such multiple PLMNs, the mobile station shall not choose a different PLMN.

Although, upon moving to the new Location Area, the UE performs the aforementioned location update, it can also be arranged to perform periodic searches for its HPLMN. If, in accordance with such searches the HPLMN is located, the UE will reselect to its HPLMN.

Such periodic searching is controlled by way of a HPLMN search timer which is known to operate in accordance with a variety of different and ever increasing timer periods generally in the magnitude of minutes. Also, in some scenarios, this timer is disabled so as to save battery power and in these instances, there is no way of achieving reselection to the HPLMN while the RPLMN remains available.

The aforementioned scenario applies equally where a more desirable, but not necessarily on HPLMN, might be available such as a higher priority PLMN.

Such known operational scenarios exhibit certain disadvantages.

Upon moving into a new location area, the UE initially performs location area update with the RPLMN and, subsequently, performs registration with the HPLMN or any other high priority PLMN assuming that the HPLMN search time has not been disabled. This leads to a disadvantageous repeated signaling between the network and the UE.

Also, the UE remains registered with the "non-home" or "visited" PLMN until expiry of the HPLMN search timer which can lead to service delays and inefficiencies. It will further also not prove cost-effective for both the user and network operator.

SUMMARY OF THE INVENTION

The invention seeks to provide for a method of PLMN selection, and a mobile radio communication device, arranged for such selection, and which exhibit advantages over known such methods and devices.

According to a first aspect of the present invention there is provided a method of PLMN selection subsequent to a change in cell for a mobile radio communications device in a multi-network cellular environment, the method including the steps of monitoring system information within a mobile radio communications device to determine the availability of a priority PLMN and selecting the said priority PLMN if identified as available.

The present invention proves advantageous in reducing the signaling arising between the network and the user equipment and also represents a relatively cost-effective solution for achieving reselection to a priority PLMN as required.

Preferably, the method comprises reselection for reselecting to the priority PLMN if available.

Yet further, the change in said cell can advantageously occur at the time of change in Location Area.

As will be appreciated, the priority PLMN can comprise either one or more of an HPLMN, an equivalent HPLMN or indeed any PLMN having a higher priority than the currently selected network.

According to another aspect of the present invention there is provided a mobile radio communications device arranged for operation in a multi-network cellular environment and further arranged for PLMN selection subsequent to a change in cell, the device further being arranged to monitor system information to determine the availability of a priority PLMN, and to select the said priority PLMN if identified as available.

As above, the device of the present invention proves advantageous in reducing the signaling arising between the network and the user equipment and also represents a relatively cost-effective solution for achieving reselection to a priority PLMN as required.

The device can be arranged for reselecting to the priority PLMN if available.

As noted, the priority PLMN can comprise either one or more of an HPLMN, an equivalent HPLMN or indeed any PLMN having a higher priority than the currently selected network.

The mobile radio communications device of the present invention advantageously comprises a network-sharing-enabled mobile radio communications device.

BRIEF DESCRIPTION OF THE DRAWING FIGURES

The invention is described further hereinafter, with reference to the accompanying drawings in which.

DETAILED DESCRIPTION OF THE INVENTION

Figure 1:
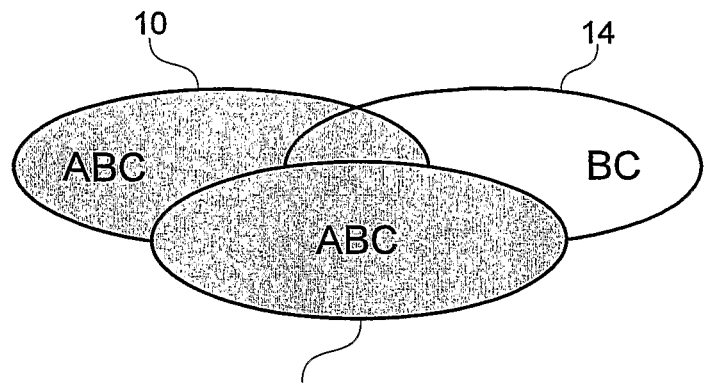
FIG. 1 is a schematic diagram of a network-sharing coverage area.

Turning first to FIG. 1, there is illustrated a network sharing coverage area comprising three location areas 10, 12, 14 and wherein three network operators A, B, C offer network services.

However, and is quite common, the same combination of network operators is not available across all three location areas. That is, and as indicated, network operators A, B, C each offer their services in location areas 10 and 12. However, only network operators B, C are available in location area 14.

Assuming that a UE belonging to a subscriber of operator A moves into location area 14, it will register itself with the PLMN of either operator B or C due to the unavailability of its HPLMN. Thus, the PLMN of either operator B or C will become RPLMN for that UE.

In accordance with the current art, even if the UE moves into location areas 10 or 12, the UE simply performs a location area update with the RPLMN and then, assuming the HPLMN search timer to be enabled, it may eventually achieve reselection of its HPLMN as part of its search procedure although disadvantageous costs and delays have thereby arisen.

In accordance within an embodiment of the present invention however, the network sharing capable UE which finds itself in location area 14 and connected to operator B or C as its RPLMN, can be arranged to determine that the RPLMN is different from its HPLMN should check for the availability of its HPLMN, or any other higher priority PLMN as appropriate.

The present invention arranges for such reselection to occur at the time UE reselects to a cell belonging to another Location Area, such as location areas 10 or 12, and where the HPLMN, or any other higher priority PLMN might be available.

As will be described in further detail below, upon changing Location Area, the present invention allows for the UE to identify the availability of its HPLMN, or indeed higher priority PLMN, within the system information transmitted within such shared networks.

Upon identifying the presence of the HPLMN or any other high priority PLMN in the system information, the UE can be arranged to reselect to this PLMN in what proves to be a particularly quick, efficient and cost-effective manner. Also, in view of the efficient manner within which such reselection can be achieved, a reduction in signaling arising between the UE and the network can advantageously be achieved since the HPLMN, or indeed a higher priority PLMN, is identified as part of the signaling procedure arising at the time of change in location area.

Further, there is no location area update on the RPLMN with subsequent reselection to HPLMN as arises in accordance with the current art.

As will therefore be appreciated, the present invention can advantageously provide for a network-sharing capable mobile radio communications device such as a cell phone handset, that is registered on a non-HPLMN, to subsequently check for the availability of the HPLMN, or indeed higher priority PLMN, while reselecting to a cell belonging to a different Location Area to that of the preceding cell.

Figure 2:
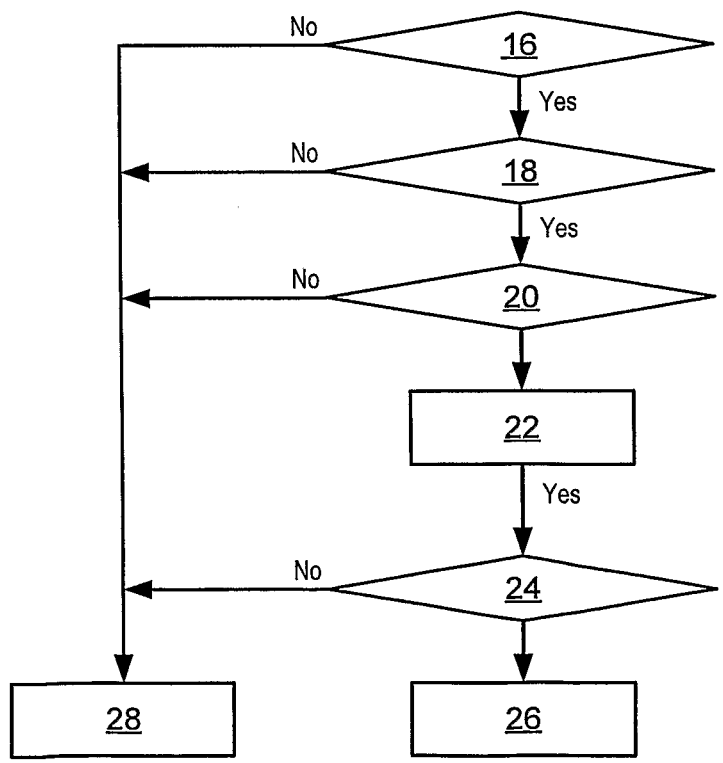
FIG. 2 is a flow diagram illustrating procedural steps according to a HPLMN or high priority PLMN reselection embodying the present invention.

Turning now to FIG. 2, there is provided a flow diagram illustrating the operation of the method according to the present invention.

The reselection to HPLMN or any other high priority PLMN procedure involves an initial determination 16 as to whether any particular UE is network-sharing-capable.

Assuming that the UE is found to be so capable, the procedure continues to determination 18 where it is determined whether or not the UE is registered on a non-HPLMN.

Again, assuming such registration to a non-HPLMN is current, the procedure continues to determination 20 where it is identified whether or not a cell belongs to a Location Area different from that of the preceding cell.

If a change in location area has been determined at step 20, the system information arising within the new cell is monitored at step 22 in order to identify the availability of the HPLMN or indeed any high priority PLMN.

If, as at step 24, it is determined that the HPLMN or high priority PLMN is in fact available, a reselection to the HPLMN or high priority occurs at step 26. However, and as illustrated, if at any stage in the procedure negative determinations are found, the procedure continues to step 28 from which the existing 3GPP procedure is followed.

It is considered that the present invention can find advantageous use in any network-sharing-capable mobile radio communications devices and can offer advantageous operation for both users and network operators in view of the relatively quick and signaling-efficient return to the HPLMN.

As will therefore be appreciated, the present invention provides for relatively quick reselection to the HPLMN, or a higher priority PLMN, within a network-sharing environment.

The invention claimed is:

1. A method of public land mobile network selection subsequent to a change in cell from a first cell to a second cell for a mobile radio communications device in a network sharing cellular environment comprising a location area, said location area comprising said second cell, said second cell being shared between a plurality of public land mobile networks, the method comprising:

monitoring, with the mobile radio communications device, system information arising within the second cell to determine the availability of a priority public land mobile network and selecting said priority public land mobile network of said plurality of public land mobile networks if identified as available, wherein the priority public land mobile network comprises one or more of a home public land mobile network, an equivalent home public land mobile network in case an equivalent home public land mobile network list is available on subscriber identity module/universal subscriber identity module, or any public land mobile network having a higher priority than a currently selected network.

2. The method as claimed in claim 1, further comprising a reselection method for reselecting to the priority public land mobile network if available.

3. The method as claimed in claim 1, wherein the change in said cell occurs at a time of change in location area.

4. The method as claimed in claim 2, wherein the change in said cell occurs at a time of change in location area.

5. The method as claimed in claim 2, wherein the priority public land mobile network comprises one or more of a home public land mobile network, an equivalent home public land mobile network in case an equivalent home public land mobile network list is available on subscriber identity module/universal subscriber identity module, or any public land mobile network having a higher priority than a currently selected network.

6. The method as claimed in claim 3, wherein the priority public land mobile network comprises one or more of a home public land mobile network, an equivalent home public land mobile network in case an equivalent home public land mobile network list is available on subscriber identity module/universal subscriber identity module, or any public land mobile network having a higher priority than a currently selected network.

7. The method as claimed in claim 4, wherein the priority public land mobile network comprises one or more of a home public land mobile network, an equivalent home public land mobile network in case an equivalent home public land mobile network list is available on subscriber identity module/universal subscriber identity module, or any public land mobile network having a higher priority than a currently selected network.

8. A mobile radio communications device arranged for operation in a network-sharing cellular environment comprising a location area, said location area comprising a shared cell, said shared cell being shared between a plurality of public land mobile networks and further arranged for public land mobile network selection subsequent to a change in cell from a first cell to said shared cell, the device further being arranged to monitor system information arising within the shared cell to determine the availability of a priority public land mobile network of said plurality of public land mobile networks, and to select the said priority public land mobile network if identified as available,
wherein the priority public land mobile network comprises one or more of a home public land mobile network, an equivalent home public land mobile network in case an equivalent home public land mobile network list is available on subscriber identity module/universal subscriber identity module, or any public land mobile network having a higher priority than a currently selected network.

9. The device as claimed in claim 8, further being arranged for reselecting to the priority public land mobile network if available.

10. The device as claimed in claim 8, wherein the priority public land mobile network comprises one or more of a home public land mobile network, an equivalent home public land mobile network any public land mobile network having a higher priority than a currently selected network.

11. A device as claimed in claim 8, further comprising a network-sharing-enabled mobile radio communications device.

12. The device as claimed in claim 9, wherein the priority public land mobile network comprises one or more of a home public land mobile network, an equivalent home public land mobile network any public land mobile network having a higher priority than a currently selected network.

13. The device as claimed in claim 9, further comprising a network-sharing-enabled mobile radio communications device.

14. The device as claimed in claim 12, further comprising a network-sharing-enabled mobile radio communications device.

15. The device as claimed in claim 10, further comprising a network-sharing-enabled mobile radio communications device.

16. A method of public land mobile network selection subsequent to a change in cell for a mobile radio communications device to a shared cell of a network-sharing cellular environment, the shared cell being shared between a plurality of public land mobile networks, the method comprising:
monitoring system information within a mobile radio communications device to determine the availability of a priority public land mobile network of said plurality of public land mobile networks and selecting said priority public land mobile network if identified as available,
wherein the priority public land mobile network comprises one or more of a home public land mobile network, an equivalent home public land mobile network in case an equivalent home public land mobile network list is available on subscriber identity module/universal subscriber identity module, or any public land mobile network having a higher priority than a currently selected network.

17. A mobile radio communications device arranged for operation in a network-sharing cellular environment comprising a shared cell, said shared cell being shared between a plurality of public land mobile networks and further arranged for public land mobile network selection subsequent to a change in cell to said shared cell, the device further being arranged to monitor system information to determine an availability of a priority public land mobile network of said plurality of public land mobile networks, and to select said priority public land mobile network if identified as available,
wherein the priority public land mobile network comprises one or more of a home public land mobile network, an equivalent home public land mobile network in case an equivalent home public land mobile network list is available on subscriber identity module/universal subscriber identity module, or any public land mobile network having a higher priority than a currently selected network.

18. A method of public land mobile network selection when a change in cell occurs for a mobile radio communications device in a multi-network cellular environment comprising a location area, said location area comprising a shared cell, said shared cell being shared between a plurality of public land mobile networks, the method comprising:
monitoring system information within a mobile radio communications device to determine the availability of a priority public land mobile network of said plurality of public land mobile networks and selecting said priority public land mobile network if identified as available, wherein
said monitoring and selecting steps being performed at a time of change in cell, and
said change in cell is to said shared cell,
wherein the priority public land mobile network comprises one or more of a home public land mobile network, an equivalent home public land mobile network in case an equivalent home public land mobile network list is available on subscriber identity module/universal subscriber identity module, or any public land mobile network having a higher priority than a currently selected network.

19. A mobile radio communications device arranged for operation in a multi-network cellular environment comprising a location area, said location area comprising a shared cell, said shared cell being shared between a plurality of public land mobile networks and further arranged for public land mobile network selection when a change in cell occurs, the device further being arranged to monitor system information to determine the availability of a priority public land mobile network of said plurality of public land mobile networks, and to select the said priority public land mobile network if identified as available, wherein the device further being arranged to perform steps of monitoring and selecting at a time of change in cell, and said change in cell is to said shared cell, and the priority public land mobile network comprises one or more of a home public land mobile network, an equivalent home public land mobile network in case an equivalent home public land mobile network list is available on subscriber identity module/universal subscriber identity module, or any public land mobile network having a higher priority than a currently selected network.

* * * * *